United States Patent [19]
Mohri et al.

[11] Patent Number: 5,538,709
[45] Date of Patent: * Jul. 23, 1996

[54] PROCESS FOR PRODUCING ALPHA-ALUMINA POWDER

[75] Inventors: Masahide Mohri; Yoshio Uchida; Yoshinari Sawabe, all of Ibaraki, Japan

[73] Assignee: Sumitomo Chemical Co., Limited, Osaka, Japan

[*] Notice: The portion of the term of this patent subsequent to Apr. 13, 2014, has been disclaimed.

[21] Appl. No.: 268,013

[22] Filed: Jun. 29, 1994

[30] Foreign Application Priority Data

Jun. 30, 1993 [JP] Japan .................. 5-188911
Jun. 30, 1993 [JP] Japan .................. 5-188913
Jun. 30, 1993 [JP] Japan .................. 5-188915
Nov. 19, 1993 [JP] Japan .................. 5-314130

[51] Int. Cl.⁶ .................................................. C01F 7/02
[52] U.S. Cl. .................................................... 423/625
[58] Field of Search ............................ 423/625; 117/950

[56] References Cited

U.S. PATENT DOCUMENTS

| | | | |
|---|---|---|---|
| 3,262,754 | 7/1966 | Lindsay et al. | 423/625 |
| 4,822,592 | 4/1989 | Misra | 423/625 |
| 5,149,520 | 9/1992 | Sucech et al. | 423/625 |
| 5,302,368 | 4/1994 | Harato et al. | 423/625 |

FOREIGN PATENT DOCUMENTS

| | | |
|---|---|---|
| 0281265 | 9/1988 | European Pat. Off. . |
| 0277730 | 5/1992 | European Pat. Off. . |
| 1767511 | 4/1977 | Germany . |
| 2850064 | 5/1980 | Germany . |
| 990801 | 5/1965 | United Kingdom ............ 423/625 |
| 2108949 | 5/1983 | United Kingdom . |
| 9015777 | 12/1990 | WIPO . |

OTHER PUBLICATIONS

62th CATSJ Meeting Abstracts: No. 2D105 (with full English translation), no date.

Primary Examiner—Steven Bos
Attorney, Agent, or Firm—Sughrue, Mion, Zinn, Macpeak & Seas

[57] ABSTRACT

A process for producing α-alumina powder comprising α-alumina single crystal particles, the process comprising the step of calcining at least one of transition alumina and a transition alumina precursor capable of becoming transition alumina on heating, in a gas atmosphere containing (1) at least about 5% by volume, based on the total gas atmosphere, of a halogen selected from fluorine, chlorine, bromine, and iodine, (2) at least about 1% by volume, based on the total gas atmosphere, of a hydrogen halide selected from hydrogen fluoride, hydrogen bromide, and hydrogen iodide, or (3) a component prepared from at least about 1% by volume, based on the total gas atmosphere, of a halogen gas selected from fluorine gas, bromine gas, and iodine gas, and at least about 0.1% by volume, based on the total gas atmosphere, of steam.

14 Claims, 3 Drawing Sheets

PROCESS FOR PRODUCING ALPHA-ALUMINA POWDER

FIELD OF THE INVENTION

This invention relates to a process for producing α-alumina powder.

BACKGROUND OF THE INVENTION

α-Alumina powder is widely used as a raw material for abrasives, sintered products, plasma spraying materials, fillers, etc. α-Alumina powder obtained by conventional processes which have been generally employed comprises irregular-shaped polycrystals, contains many agglomerated particles, and has broad particle size distribution. Furthermore, the purity of such conventional α-alumina powder is insufficient for some uses. In order to overcome these disadvantages for some specific uses, α-alumina powder produced by special processes as hereinafter described has been employed. However, these special processes still involve difficulty in producing α-alumina powder with a narrow particle size distribution, which comprises homogeneous α-alumina particles.

Among general processes for producing α-alumina powder a Bayer's process is the most economical process. In a Bayer's process, bauxite is once converted to aluminum hydroxide or transition alumina, which is then calcined in air to prepare α-alumina powder.

The aluminum hydroxide or transition alumina which is obtained as an intermediate product on an industrial scale at low cost generally comprises agglomerated particles having a diameter of greater than 10 μm. α-Alumina powder obtained by calcination of such aluminum hydroxide or transition alumina in air comprises primary particles of irregular shape containing many coarse particles agglomerated strongly. The α-alumina powder containing coarse agglomerated particles is ground into final products by means of a ball mill, a vibration mill, etc., but grinding is not always easy and incurs the cost. Further, α-alumina powder having poor grindability needs a long grinding time. Consequently too fine powder may be formed, which is unsuitable particularly as a raw material of abrasives.

Several proposals have been made to solve these problems. For example, JP-A-59-97528 (the term "JP-A" as used herein means an "unexamined published Japanese patent application") teaches a process for improving the shape of α-alumina powder, which comprises calcining aluminum hydroxide prepared by a Bayer's process in the presence of an ammonium-containing boron or boron series mineralizer to obtain α-alumina powder.

In order to remove sodium and to control the particle size simultaneously, it has been proposed to carrying out calcination of sodium-containing aluminum hydroxide obtained by a Bayer's process in the presence of (1) a chlorine-containing material and a fluorine-containing material (as described in British Patent 990,801) or (2) boric acid and a chloride, such as ammonium chloride or hydrogen chloride (as described in West German Patent 176,511).

JP-B-43-8929 (the term "JP-B" as used herein means an "examined published Japanese patent application") discloses calcination of alumina hydrate in the presence of ammonium chloride.

However, any of these processes proposed is still unsatisfactory for obtaining homogeneous and high-purity α-alumina powder having a uniform particle shape and a narrow particle size distribution.

Known special processes for producing α-alumina powder include a hydrothermal process comprising a hydrothermal reaction of aluminum hydroxide in the presence of corundum as a seed crystal (as described in JP-B-57-22886) and a flux process comprising calcining aluminum hydroxide in the presence of a fluorine series flux having a melting point of 800° C. or lower (as described in JP-A-3-131517).

Because the hydrothermal process is carried out in a high temperature under a high pressure, it involves a problem in that the resulting α-alumina powder becomes expensive. Because the flux added remains in the α-alumina powder obtained by the flux process, it involves a problem in that the remaining flux must be removed by washing to obtain α-alumina of high purity.

SUMMARY OF THE INVENTION

An object of the present invention is to provide a process for producing m-alumina powder comprising homogeneous α-alumina single crystal particles from various alumina raw materials.

Another object of the present invention is to provide a process for producing α-alumina powder comprising α-alumina single crystal particles having an octahedral or a higher polyhedral shape, a D/H ratio of from 0.5 to 30, a narrow primary particle size distribution, and a high alumina purity, the individual particles having a uniform composition and structural homogeneity.

These and other objects and effects of the present invention will be apparent from the following description.

The present inventors have found that the above objects of the present invention are accomplished by calcining an alumina raw material in a gas atmosphere containing a specific amount of a specific component. The present invention has been completed based on this finding.

The present invention relates to a process for producing α-alumina powder comprising α-alumina single crystal particles, the process comprising the step of calcining at least one of transition alumina and a transition alumina precursor capable of becoming transition alumina on heating, in a gas atmosphere containing (1) at least about 5% by volume, based on the total gas atmosphere, of a halogen selected from fluorine, chlorine, bromine, and iodine, (2) at least about 1% by volume,-based on the total gas atmosphere, of a hydrogen halide selected from hydrogen fluoride, hydrogen bromide, and hydrogen iodide, or (3) a component prepared from at least about 1% by volume, based on the total gas atmosphere, of a halogen gas selected from fluorine gas, bromine gas, and iodine gas, and at least about 0.1% by volume, based on the total gas atmosphere, of steam.

DETAILED DESCRIPTION OF THE INVENTION

Figure 1:
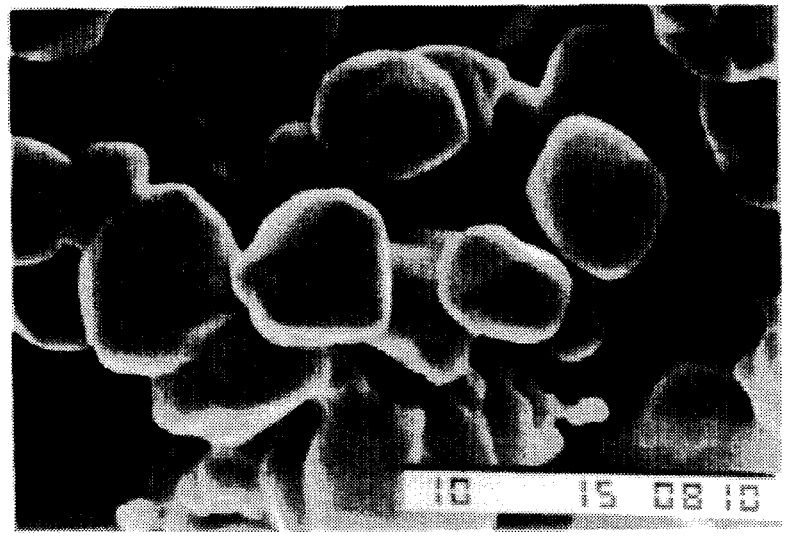
FIG. 1 is a scanning electron microscope (SEM) photograph (magnification: 4500) showing the particulate structure of the α-alumina powder obtained in Example 1.

The α-alumina powder according to the present invention can be prepared from an alumina raw material selected from transition alumina, a raw material capable of being converted to transition alumina on heating (hereinafter referred to as a transition alumina precursor), and a mixture thereof. Transition alumina means all alumina species included under polymorphic alumina represented by $Al_2O_3$ except α-alumina. Specific examples of the transition alumina include γ-alumina, β-alumina, and θ-alumina. The transition alumina precursor includes those which can be converted to α-alumina via transition alumina by the calcination step according to the process of the present invention. Examples of the transition alumina precursor include aluminum hydroxide, aluminum sulfate, alum (e.g., potassium aluminum sulfate or ammonium aluminum sulfate), ammonium aluminum carbonate, and alumina gel (e.g., one obtained by electro-discharge of aluminum in water).

The transition alumina and transition alumina precursors which can be used in the present invention are not particularly limited in synthesis. For example, aluminum hydroxide can be obtained by a Bayer's process, hydrolysis of an organoaluminum compound, or a process starting with an aluminum compound recovered from an etching waste used for condensers, etc. Transition alumina can be obtained by a heat treatment of aluminum hydroxide, decomposition of aluminum sulfate, decomposition of alum, gaseous phase decomposition of aluminum chloride, or decomposition of ammonium aluminum carbonate.

According to the process of the present invention, desired α-alumina powder can be obtained even from aluminum hydroxide or transition alumina having a particle size of 10 μm or greater which is obtained by an industrially economical process, such as a Bayer's process.

The transition alumina and/or a precursor thereof is calcined in (1) a gas atmosphere containing a halogen. Examples of the halogen which can be used include fluorine, chlorine, bromine, and iodine, with fluorine and chlorine being preferred, and chlorine being more preferred. The halogen concentration of the gas atmosphere is about 5% by volume or more, preferably about 10% by volume or more, more preferably 20% by volume or more, and most preferably 30% by volume or more, each based on the total gas atmosphere. While not limiting, incorporation of a halogen into a gas atmosphere is usually carried out by introducing a halogen gas into the reaction system. Component(s) other than the halogen in the gas atmosphere, so-called diluent gas include inert gases (e.g., nitrogen and argon), hydrogen, and air. The pressure of the halogen-containing gas atmosphere is not critical and may be selected arbitrarily from an industrially practical range.

Calcination in the halogen-containing gas atmosphere is preferably conducted at a temperature of from 1150° to 1500° C., and more preferably from 1200° to 1400° C. Where the starting material, i.e., transition alumina and/or a precursor thereof, has a large particle size, for example, where agglomerated particles having an average particle size exceeding 10 μm are used, a relatively high calcining temperature within the above-recited range, particularly 1250° C. or higher is preferred.

Calcination should be continued for such a time sufficient for the starting material to grow to α-alumina. While depending on the kind and the concentration of the gas atmosphere, the calcining temperature, and the like conditions, the calcination time is generally 1 minute or more, and preferably 10 minutes or more, but is not limited thereto. According to this process, α-alumina powder comprising α-alumina single crystal particles can be obtained in a reduced calcination time as compared with conventional techniques.

The gas atmosphere containing a halogen (1) may be replaced with a gas atmosphere containing (2) a hydrogen halide. In this case, transition alumina and/or a precursor thereof is calcined in an atmosphere containing a hydrogen halide in a concentration of about 1% by volume or more, preferably 5% by volume or more, more preferably 10% by volume or more, and most preferably 20% by volume or more, each based on the total gas atmosphere. Examples of the hydrogen halide which can be used include hydrogen fluoride, hydrogen bromide, and hydrogen iodide, with hydrogen fluoride and hydrogen bromide being preferred, and hydrogen bromide being more preferred. While not limiting, incorporation of the hydrogen halide into a gas atmosphere is usually effected by introducing a hydrogen halide gas into the reaction system. Component(s) other than the hydrogen halide in the gas atmosphere, so-called diluent gas include inert gases (e.g., nitrogen and argon), hydrogen, and air. The pressure of the halogen-containing gas atmosphere is not critical and may be selected arbitrarily from an industrially practical range.

Calcination in the hydrogen halide-containing gas atmosphere is preferably conducted at a temperature of from 600° to 1400° C., more preferably from 700° to 1300° C., and most preferably from 800° to 1200° C. Where the starting material, i.e., transition alumina and/or a precursor thereof, has a large particle size, for example, where agglomerated particles having an average particle size exceeding 10 μm are used, a relatively high calcining temperature within the above-recited range, particularly 800° C. or higher is preferred.

Calcination should be continued for such a time sufficient for the starting material to grow to α-alumina. While depending on the kind and the concentration of the gas atmosphere, the calcining temperature, and the like conditions, the calcination time is generally 1 minute or more, and preferably 10 minutes or more, but is not limited thereto. According to this process, α-alumina powder comprising α-alumina single crystal particles can be obtained in a reduced calcination time as compared with conventional techniques.

The gas atmosphere containing a halogen (1) or a hydrogen halide (2) may be replaced with a gas atmosphere containing (3) a component prepared from a halogen gas and steam. In this case, transition alumina and/or a precursor thereof is calcined in a gas atmosphere containing a component prepared from about 1% by volume or more of a halogen gas and about 0.1% by volume or more of steam; more preferably about 10% by volume or more of a halogen gas and about 1% by volume or more of steam; and most preferably about 20% by volume or more of a halogen gas and most preferably about 2% by volume or more of steam, each based on the total volume of the gas atmosphere. Examples of the halogen gas used include fluorine gas, bromine gas, and iodine gas, with fluorine gas or bromine gas being preferred, and bromine gas being more preferred. While not limiting, incorporation of a component prepared from a halogen and steam into a gas atmosphere can be effected usually by introducing a halogen gas and steam into the reaction system. Component(s) other than the component prepared from the halogen and steam in the gas atmosphere, so-called diluent gas include inert gases (e.g., nitrogen and argon), hydrogen, and air. The pressure of the atmosphere is not particularly critical and may be selected arbitrarily from an industrially practical range.

Calcination in the gas atmosphere containing a component prepared from a halogen gas and steam is preferably conducted at a temperature of from 600° to 1400° C., more preferably from 700° to 1300° C., and most preferably from 800° to 1200° C. Where the starting material, i.e., transition alumina and/or a precursor thereof, has a large particle size, for example, where agglomerated particles having an average particle size exceeding 10 μm are used, a relatively high calcining temperature within the above-recited range, particularly 800° C. or higher is preferred.

Calcination should be continued for such a time sufficient for the starting material to grow to α-alumina. While depending on the kind and the concentration of the gas atmosphere, the calcining temperature, and the like conditions, the calcination time is generally 1 minute or more, and preferably 10 minutes or more, but is not limited thereto. According to this process, α-alumina powder comprising α-alumina single crystal particles can be obtained in a reduced calcination time as compared with conventional techniques.

The method for feeding a gas atmosphere to the system is not particularly restricted, as long as a gas atmosphere containing (1) a halogen, (2) a hydrogen halide or (3) a component prepared from a halogen gas and steam can be introduced into a reaction system containing a raw material, such as transition alumina. The concentration of the halogen, hydrogen halide or component prepared from a halogen gas and steam in the gas atmosphere should be controlled during calcination. A gas cylinder is usually used as a source of supply of a halogen, a hydrogen halide, or a halogen gas. Where an aqueous solution of a hydrogen halide, a halogen compound, e.g., an ammonium halide, or a halogen-containing high polymer is used as a source of a halogen, a hydrogen halide or a halogen gas, it can be fed at its vapor pressure or as decomposed so as to give a prescribed gas composition. The supply of gas may be either in a continuous manner or in a batch system.

The calcining apparatus is not particularly limited, and a general calcining furnace can be employed. The calcining furnace is preferably made of a material resistant to corrosion by a hydrogen halide gas, a halogen gas, etc. The furnace is preferably equipped with a mechanism for controlling the concentration of the halogen, hydrogen halide or component prepared from a halogen gas or steam in the gas atmosphere. Because an acidic gas, e.g., a hydrogen halide or a halogen gas, is used, the furnace is preferably air-tight. For industrial production, calcination is preferably carried out in a continuous manner by means of, for example, a tunnel kiln, a rotary kiln or a pusher oven.

Since the reaction proceeds in an acidic gas atmosphere, a crucible, a boat or a like tool used in the process is preferably made of alumina, quartz, acid resistant brick or graphite.

α-Alumina powder obtained by the process of the present invention comprises α-alumina single crystal particles having an octahedral or higher polyhedral shape. The average diameter of the α-alumina single crystal particles is usually 4 μm or greater, and preferably of from 4 to 30 μm. The α-alumina single crystal particles produced in a gas atmosphere containing chlorine, bromine, iodine, hydrogen bromide, hydrogen iodide, a component prepared from bromine gas and steam, or a component prepared from iodine gas and steam usually have a D/H ratio, wherein D represents a maximum particle diameter parallel to a hexagonal lattice plane of a hexagonal close-packed lattice of α-alumina, and H represents a maximum particle diameter perpendicular to the lattice plane, of from 0.5 to 5, and preferably from 0.5 to 3. Those produced in a gas atmosphere containing fluorine, hydrogen fluoride, or a component prepared from fluorine gas and steam usually have a D/H ratio of from 1 to 30, and preferably from 3 to 30.

Further, the α-alumina powder comprising α-alumina single crystal particles preferably has a ratio of the maximum particle diameter to the number average particle diameter of 3 or less, and more preferably 2.5 or less, as obtained by image analysis. The purity of the α-alumina powder is usually not less than 99.8%, and preferably not less than 99.9%.

According to the process of the present invention, α-alumina powder comprising α-alumina single crystal particles having high purity, homogeneity, a narrow primary particle size distribution, and an octahedral or higher polyhedral shape, can be obtained from alumina raw materials of a variety of kinds, shapes, sizes, and compositions, with industrial advantages.

The α-alumina powder obtained by the process of the present invention is suitable as a raw material for abrasives, sintered products, plasma spraying materials, fillers, single crystals, supports for catalysts, fluorescent substances, encapsulants, ceramic filters, and spacers for liquid crystal cells, and is extremely useful in industry.

The present invention will now be illustrated in greater detail with reference to Examples, but it should be understood that the present invention is not construed as being limited thereto.

Measurements in Examples and Comparative Examples were made as follows.

1) Number Average Particle Diameter:

A micrograph of α-alumina powder was taken with a scanning electron microscope (SEM) ("T-300" manufactured by JEOL Ltd., hereinafter the same), and 80 to 100 particles selected were subjected to image analysis to obtain an average circle-equivalent diameter. The term "circle-equivalent diameter" as used herein means a diameter of a true circle having the same area as that of a particle.

2) Crystal Shape (D/H Ratio):

The shape of α-alumina particles was expressed in terms of a D/H ratio, wherein D and H are as defined above. Five to 10 particles were selected from the above-mentioned SEM photograph and subjected to image analysis to obtain an average D/H ratio.

Raw materials to be calcined in Examples and Comparative Examples are shown below.

1. Transition alumina:

Transition alumina obtained by calcination of aluminum hydroxide prepared by hydrolysis of organoaluminum oxide ("AKP-G15" produced by Sumitomo Chemical Co., Ltd.; particle diameter: about 4 μm) (abbreviated as tr-al in Tables).

2. Aluminum hydroxide:

Powder prepared by hydrolysis of aluminum isopropoxide (secondary particle diameter: about 8 μm) (abbreviated as al-hy in Tables).

Chlorine packed in a cylinder, produced by Fujimoto Sangyo K. K., was used as a chlorine gas source.

The halogen or hydrogen halide concentration in a gas atmosphere was controlled by adjustment of the gas flow rate of the halogen, hydrogen halide, diluent gas, etc. to be fed by means of a flowmeter. The linear flow rate was set at 20 to 49 mm/min (gas flow system). In all Examples and Comparative Examples, calcination was conducted under atmospheric pressure.

A decomposition gas of ammonium fluoride was used as a hydrogen fluoride gas source. Ammonium fluoride was heated to its subliming temperature (220° C.), and the resulting gas was introduced into the tube of a tubular furnace. The gas atmosphere was composed of 33% by volume of hydrogen fluoride, 17% by volume of hydrogen, and 50% by volume of nitrogen at a retention temperature (calcining temperature) of 1100° C.

A decomposition gas of ammonium bromide was used as a hydrogen bromide gas source. Ammonium bromide was heated to its subliming temperature (420° C.), and the resulting gas was introduced into the tube of a tubular furnace. The gas atmosphere was composed of 33% by volume of hydrogen bromide, 17% by volume of hydrogen, and 50% by volume of nitrogen at a retention temperature (calcining temperature) of 1100° C.

A decomposition gas of ammonium iodide was used as a hydrogen iodide gas source. Ammonium iodide was heated to its subliming temperature (380° C.), and the resulting gas was introduced into the tube of a tubular furnace. The gas atmosphere was composed of 33% by volume of hydrogen iodide, 17% by volume of hydrogen, and 50% by volume of nitrogen at a retention temperature (calcining temperature) of 1100° C.

A prescribed amount (0.4 g) of a starting material (transition alumina and/or a precursor thereof) was put in an alumina boat to a height of 5 mm. Calcination was carried out in a tubular furnace ("DSPSH-28" produced by Motoyama K. K.) using an alumina tube (diameter: 27 mm; length: 1000 mm). The temperature was raised at a rate of 500° C./hr while feeding nitrogen gas, and a gas having a prescribed composition was introduced into the tubular furnace when the temperature reached to a prescribed temperature (hereinafter referred to as a gas feed temperature).

On reaching a prescribed temperature, the furnace was maintained at that temperature (hereinafter referred to as a retention temperature (calcining temperature)) for a prescribed time (hereinafter referred to as a retention time (calcination time)). Where the gas atmosphere comprises the decomposition gas, the reaction was conducted under a closed condition without a flow of the gas atmosphere. Where the gas atmosphere comprises chlorine gas, the reaction was conducted under a flow of the gas atmosphere at the above-described linear flow rate. After a lapse of a prescribed retention time, the furnace was allowed to cool to obtain α-alumina powder.

EXAMPLE 1

Transition alumina (γ-alumina), as an alumina raw material, was calcined at a calcining temperature of 1280° C. for a calcination time of 30 minutes in a gas atmosphere containing chlorine gas. The chlorine gas feed temperature was room temperature. The calcining conditions and the results are shown in Tables 1 and 2 below. The SEM photograph of the α-alumina powder obtained is shown in FIG. 1.

EXAMPLE 2

Figure 2:
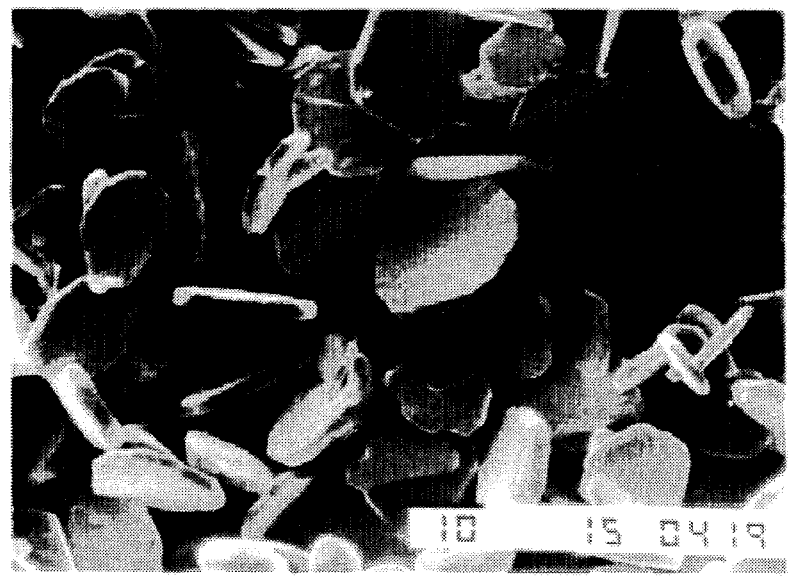
FIG. 2 is an SEM photograph (magnification: 900) showing the particulate structure of the m-alumina powder obtained in Example 2.

Transition alumina (γ-alumina), as an alumina raw material, was calcined at a calcining temperature of 1100° C. for a calcination time of 30 minutes in a gas atmosphere containing a decomposition gas of ammonium fluoride (i.e., hydrogen fluoride). The gas feed temperature was 800° C. The calcination conditions and the results obtained are shown in Tables 1 and 2. The SEM photograph of the α-alumina powder obtained is shown in FIG. 2.

EXAMPLE 3

Figure 3:
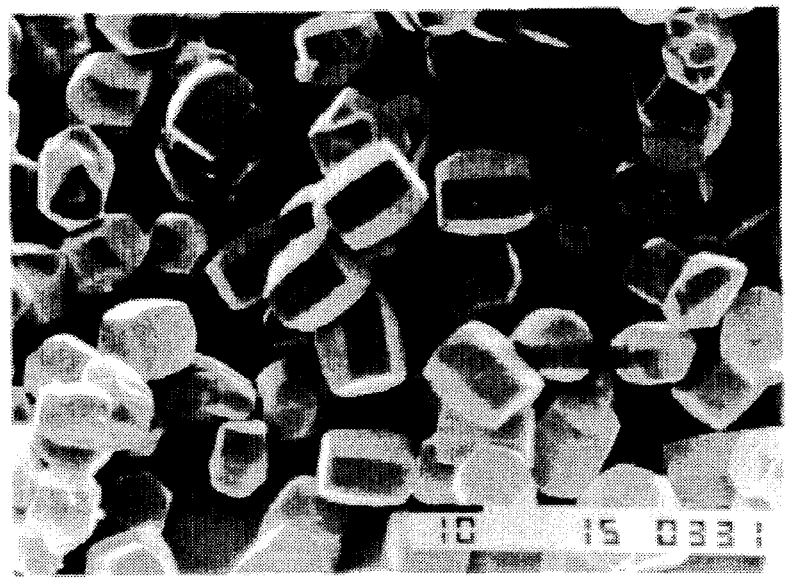
FIG. 3 is an SEM photograph (magnification: 900) showing the particulate structure of the m-alumina powder obtained in Example 3.

Calcination was carried out in the same manner as in Example 2, except for replacing the decomposition gas of ammonium fluoride with a decomposition gas of ammonium bromide (i.e., hydrogen bromide). The SEM photograph of the α-alumina powder obtained is shown in FIG. 3. The calcination conditions and the results obtained are shown in Tables 1 and 2.

EXAMPLE 4

Figure 4:
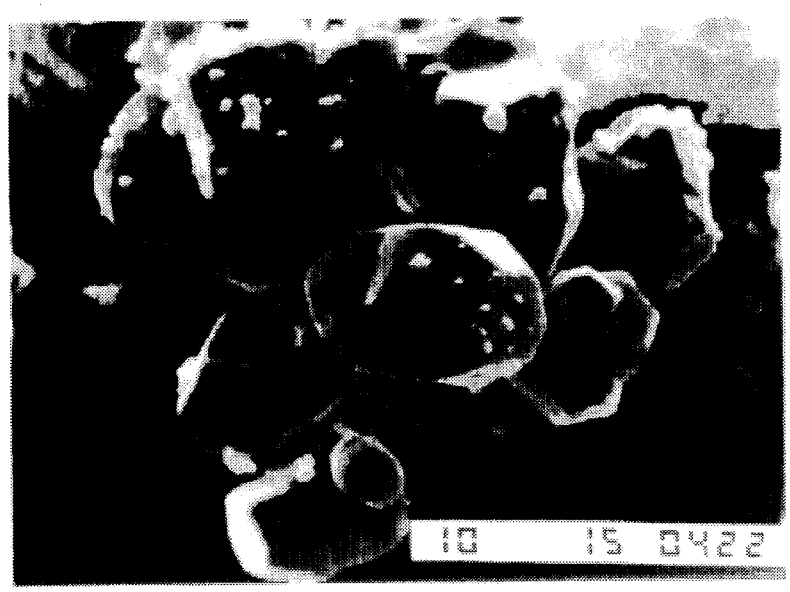
FIG. 4 is an SEM photograph (magnification: 4300) showing the particulate structure of the m-alumina powder obtained in Example 4.

Calcination was carried out in the same manner as in Example 2, except for replacing the decomposition gas of ammonium fluoride with a decomposition gas of ammonium iodide (i.e., hydrogen iodide). The SEM photograph of the α-alumina powder obtained is shown in FIG. 4. The calcination conditions and the results obtained are shown in Tables 1 and 2.

EXAMPLE 5

Calcination is carried out in the same manner as in Example 2, except for using a gas atmosphere to which fluorine gas and steam are fed. As a result, α-alumina powder equal to that obtained in Example 2 is obtained.

EXAMPLE 6

Calcination is carried out in the same manner as in Example 2, except for using aluminum hydroxide as an alumina raw material. As a result, α-alumina powder equal to that obtained in Example 2 is obtained.

EXAMPLE 7

Calcination is carried out in the same manner as in Example 3, except for using a gas atmosphere to which bromine gas and steam are fed. As a result, α-alumina powder equal to that obtained in Example 3 is obtained.

EXAMPLE 8

Calcination is carried out in the same manner as in Example 3, except for using aluminum hydroxide as an alumina raw material. As a result, α-alumina powder equal to that obtained in Example 3 is obtained.

EXAMPLE 9

Calcination is carried out in the same manner as in Example 4, except for using a gas atmosphere to which iodine gas and steam are fed. As a result, α-alumina powder equal to that obtained in Example 4 is obtained.

EXAMPLE 10

Calcination is carried out in the same manner as in Example 4, except for using aluminum hydroxide as an alumina raw material. As a result, α-alumina powder equal to that obtained in Example 4 is obtained.

COMPARATIVE EXAMPLE 1

Figure 5:
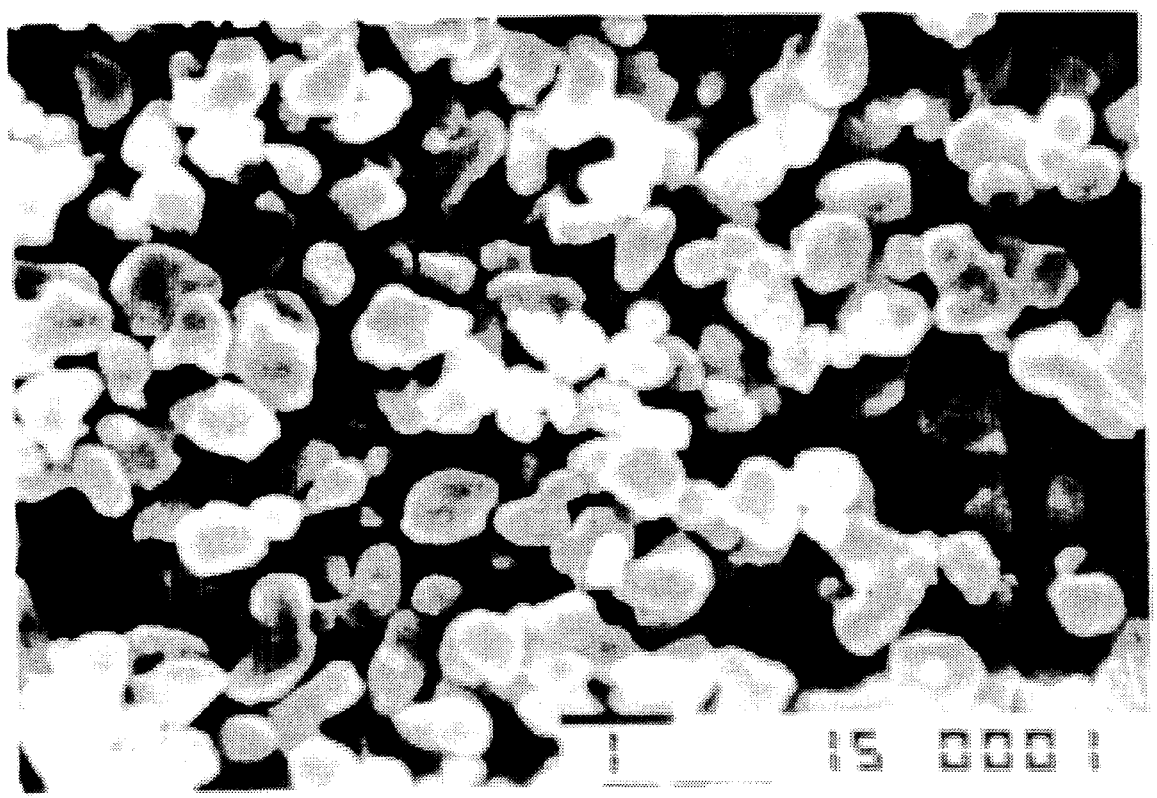
FIG. 5 is an SEM photograph (magnification: 9000) showing the particulate structure of the m-alumina powder obtained in Comparative Example 1.

Aluminum hydroxide was calcined at a calcining temperature of 1350° C. for a calcination time of 180 minutes in air. The SEM photograph of the α-alumina powder obtained is shown in FIG. 5. The calcination conditions and the results obtained are shown in Tables 1 and 2.

TABLE 1

| | Alumina raw material | | Composition of gas atmosphere (vol %) | | | | | |
|---|---|---|---|---|---|---|---|---|
| Example No. | Kind | Particle size (μm) | $Cl_2$ | HF | HBr | HI | $N_2$ | $H_2$ |
| Example 1 | tr-al | 4 | 100 | — | — | — | — | — |
| Example 2 | tr-al | 4 | — | 33 | — | — | 17 | 50 |
| Example 3 | tr-al | 4 | — | — | 33 | — | 17 | 50 |
| Example 4 | tr-al | 4 | — | — | — | 33 | 17 | 50 |
| Comparative Example 1 | al-hy | 8 | (calcined in air) | | | | | |

TABLE 2

| Example No. | Gas flow rate (mm/sec) | Gas feed temperature (°C.) | Retention temperature (°C.) | Retention time (min) | Number average particle diameter (μm) | D/H ratio | Maximum particle diameter (μm) |
|---|---|---|---|---|---|---|---|
| Example 1 | 20 | room temperature | 1280 | 30 | 4 | 1 | 6 |
| Example 2 | 20 | 800 | 1100 | 30 | 16 | 5.3 | 35 |
| Example 3 | 20 | 800 | 1100 | 30 | 11 | 0.8 | 14 |
| Example 4 | 20 | 800 | 1100 | 30 | 7 | 0.8 | 13 |
| Comparative Example 1 | | | 1350 | 180 | | non-uniform | |

While the invention has been described in detail and with reference to specific examples thereof, it will be apparent to one skilled in the art that various changes and modifications can be made therein without departing from the spirit and scope thereof.

What is claimed is:

1. A process for producing α-alumina powder comprising α-alumina single crystal particles, said process comprising the step of calcining at least one member of the group consisting of transition alumina, aluminum hydroxide, alum, and aluminum sulfate, in a gas atmosphere containing at least 5% by volume, based on the total gas atmosphere, of a halogen selected from the group consisting of bromine and iodine.

2. A process as claimed in claim 1, wherein said gas atmosphere contains at least about 10% by volume, based on the total gas atmosphere, of said halogen.

3. A process as claimed in claim 1, wherein said gas atmosphere contains at least about 20% by volume, based on the total gas atmosphere, of a halogen.

4. A process as claimed in claim 1, wherein said calcining is conducted at a temperature of from 1150° to 1500° C.

5. A process as claimed in claim 1, wherein said α-alumina powder comprises homogeneous α-alumina single crystal particles having an octahedral or higher polyhedral shape and a D/H ratio of from 0.5 to 5, wherein d represents a maximum particle diameter parallel to a hexagonal lattice plane of a hexagonal close-packed lattice of α-alumina, and H represents a maximum particle diameter perpendicular to the lattice plane.

6. A process for producing α-alumina powder comprising α-alumina single crystal particles, said process comprising the step of calcining at least one member selected from the group consisting of transition alumina, aluminum hydroxide, alum, and aluminum sulfate, at a temperature of from 800° to 1,200° C., in a gas atmosphere containing at least about 1% by volume, based on the total gas atmosphere, of a hydrogen halide selected from the group consisting of hydrogen bromide and hydrogen iodide.

7. A process as claimed in claim 6, wherein said gas atmosphere contains at least about 5% by volume, based on the total gas atmosphere, of said hydrogen halide.

8. A process as claimed in claim 6, wherein said gas atmosphere contains at least about 10% by volume, based on the total gas atmosphere, of said hydrogen halide.

9. A process as claimed in claim 6, wherein said α-alumina powder comprises homogeneous α-alumina single crystal particles having an octahedral or higher polyhedral shape and a D/H ratio of from 0.5 to 5, wherein D represents a maximum particle diameter parallel to a hexagonal lattice plane of a hexagonal close-packed lattice of α-alumina, and H represents a maximum particle diameter perpendicular to the lattice plane.

10. A process for producing α-alumina powder comprising α-alumina single crystal particles, said process comprising the step of calcining at least one member selected from the group consisting of transition alumina, aluminum hydroxide, alum, and aluminum sulfate, at a temperature of from 800° to 1,200° C., in a gas atmosphere containing at least 1% by volume, based on the total gas atmosphere, of a halogen gas selected from the group consisting of bromine gas and iodine gas, and at least about 0.1% by volume, based on the total gas atmosphere, of steam.

11. A process as claimed in claim 10, wherein said gas atmosphere contains a component prepared from at least about 10% by volume, based on the total gas atmosphere, of a halogen gas selected from the group consisting of bromine gas and iodine gas, and about at least 1% by volume, based on the total gas atmosphere, of steam.

12. A process as claimed in claim 10, wherein said gas atmosphere contains at least about 20% by volume, based on the total gas atmosphere, of a halogen gas selected from the group consisting of bromine gas and iodine gas, and at least about 2% by volume, based on the total gas atmosphere, of steam.

13. A process as claimed in claim 10, wherein said α-alumina powder comprises homogeneous α-alumina single crystal particles having an octahedral or higher polyhedral shape and a D/H ratio of from 0.5 to 5, wherein D represents a maximum particle diameter parallel to a hexagonal lattice plane of a hexagonal close-packed lattice of α-alumina, and H represents a maximum particle diameter perpendicular to the lattice plane.

14. A process as claimed in claim 10, wherein said α-alumina powder comprises homogeneous α-alumina single crystal particles having a D/H ratio of from 0.5 to 5, wherein D represents a maximum particle diameter parallel to a hexagonal lattice plane of a hexagonal close-packed lattice of α-alumina, and H represents a maximum particle diameter perpendicular to the lattice plane.

* * * * *